United States Patent [19]

Twerdochlib

[11] Patent Number: 4,766,557
[45] Date of Patent: Aug. 23, 1988

[54] APPARATUS FOR MONITORING HYDROGEN GAS LEAKAGE INTO THE STATOR COIL WATER COOLING SYSTEM OF A HYDROGEN COOLED ELECTRIC GENERATOR

[75] Inventor: Michael Twerdochlib, Oviedo, Fla.

[73] Assignee: Westinghouse Electric Corp., Pittsburgh, Pa.

[21] Appl. No.: 876,562

[22] Filed: Jun. 20, 1986

[51] Int. Cl.$^4$ .................... G06C 11/30; H02K 9/00
[52] U.S. Cl. ................... 364/550; 364/557; 364/558; 340/605; 73/40.5 R; 310/52; 310/53
[58] Field of Search ............... 364/550, 558, 557, 564, 364/510, 551; 340/605, 614; 310/53, 59, 57, 58, 52, 54, 56; 73/40.5 R, 40, 49.2; 374/142, 143, 152; 55/274

[56] References Cited
U.S. PATENT DOCUMENTS
3,916,445 10/1975 Alliston et al. ................. 364/300

Primary Examiner—Parshotam S. Lall
Assistant Examiner—David C. Goldman
Attorney, Agent, or Firm—D. Schron

[57] ABSTRACT

Apparatus which provides an indication of gas leakage from the interior of an electric generator into a closed circuit water-cooling system for the generator's stator coils. The closed circuit water-cooling system includes a water tank for degasification with the closed volume above the water level being occupied by a gas of the same type as the generator interior. Sensors are provided for obtaining indications of pressure, temperature and volume of the gas, and from these indications the number of moles of gas in the tank are calculated in periodic time increments. The gas is maintained within certain pressure limits by the addition or venting of gas, and if an addition or venting has taken place from one calculation to a next, a projected value for the number of moles is calculated after the change, had the change not occurred. The difference between the actual and projected value is then added onto subsequent calculated values to obtain a history of gas leakage.

8 Claims, 5 Drawing Sheets

APPARATUS FOR MONITORING HYDROGEN GAS LEAKAGE INTO THE STATOR COIL WATER COOLING SYSTEM OF A HYDROGEN COOLED ELECTRIC GENERATOR

BACKGROUND OF THE INVENTION

1. Field of the Invention

The invention in general relates to electric generator monitoring, and particularly to apparatus which will detect a cracked stator coil or other portion of a stator coil water-cooling system.

2. Description of the Prior Art

Modern electric generators such as those driven by steam turbines have the capacity to carry several thousand amperes of current in their stator windings. Such arrangement generates a large amount of heat due to the stator winding resistance as well as rotor winding resistance and windage losses. Accordingly, a cooling system must be provided in order to remove the heat resulting from the electrical and windage losses during normal operation.

One type of cooling system utilizes a flow of cooling gas, such as hydrogen, within the generator housing as well as within the rotor and stator structures to remove the produced heat. In one type of design, a cooling liquid such as water is passed through hollow conductors in the stator coils themselves for cooling purposes. The stator coil water system is a closed circuit which is independent of the hydrogen cooling gas arrangement, with the water within the closed circuit being at a lower pressure than the hydrogen pressure.

If during operation of the electrical generator, a stator coil should crack, hydrogen will find its way into the closed circuit water-cooling system. The closed circuit system includes a water reservoir which is pressurized by a hydrogen gas which may be periodically added and/or vented in order to maintain a predetermined pressure range. The hydrogen in the tank, therefore, may be due to the external hydrogen source or the cooling hydrogen which has leaked in due to a cracked stator coil or other breach of the closed circuit cooling system.

The apparatus of the present invention is operable to determine if there is leakage of hydrogen cooling gas into the water-cooling system which, when coupled with other sensor outputs normally provided in such diagnostic equipment, may be confirmatory of a cracked stator coil.

SUMMARY OF THE INVENTION

The apparatus of the present invention monitors cooling gas leakage into the closed circuit liquid cooling system of an electric generator, the interior of which is cooled by the gas, and the stator coils of which are cooled by the liquid cooling system. The liquid cooling system itself includes a liquid tank pressurized by a gas of the same type as the cooling gas.

Sensor means are provided to sense predetermined parameters relative to the tank and to provide corresponding output signals indicative of such parameters. Computer means responsive to the output signals is operable in repetitive time increments to calculate, for each time increment, the number of moles of gas within the tank. If the gas within the tank goes outside of certain pressure limits, more of the gas is added, or the gas in the tank is suddenly vented and means are provided for determining a relatively rapid change in the number of moles due to the addition or venting of gas.

The computer means is operable to estimate a projected value for the number of moles of the gas after a change, had the change not occurred. Thereafter, the computer means is operable to obtain the difference between the projected value and the actual calculated number of moles, with the difference therebetween being added to the actual calculated number of moles for that time increment, and to subsequent calculated number of moles for subsequent time increments. This process is continued until the next rapid change whereupon a new projected value and difference is obtained. In this manner, the number of moles of increase of gas due only to leakage of the gas may be obtained from which the total loss of hydrogen as well as the loss per unit time may be determined so as to provide an operator with pertinent information relative to such leak.

DESCRIPTION OF THE PREFERRED EMBODIMENT

Figure 1:
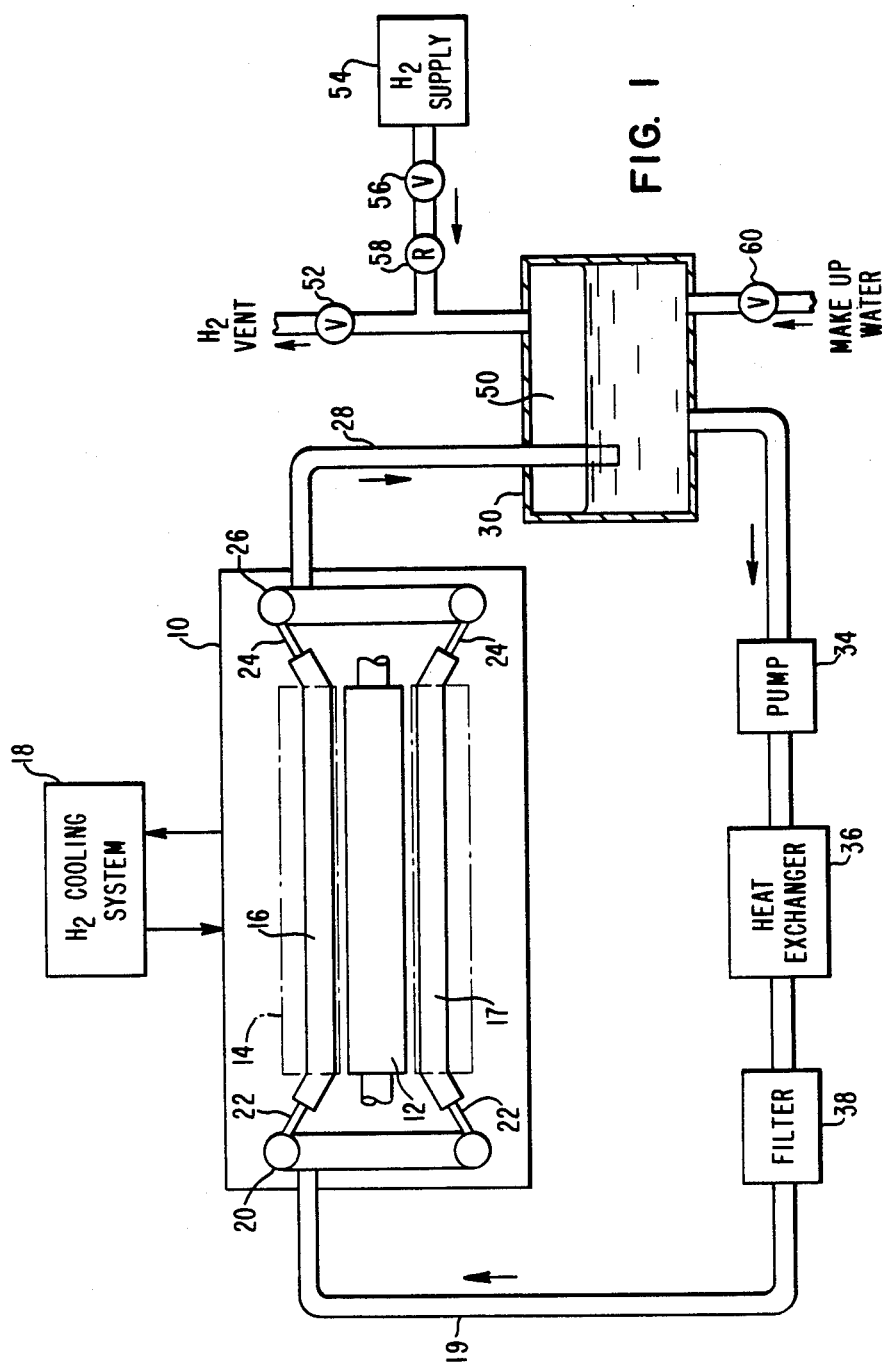
FIG. 1 is a simplified presentation of a stator coil water-cooling system.

In FIG. 1, electric generator 10 includes a rotor 12 surrounded by a stator 14 shown in phantom lines. A typical stator has a plurality of slots for receiving the stator windings or coils two sections of which, 16 and 17, are illustrated. Each of the coil sections include a plurality of copper conductors or strands, some of which are hollow for passage of cooling water instrumental in the heat removal process. Heat is additionally removed from the interior of generator 10 by means of an auxiliary gas cooling system 18, the gas typically being hydrogen.

Cooled water is provided, via supply pipe 19 to a ring manifold 20 with the water being conducted to the hollow strands of the coil sections by means of tubes 22. After passage through the coil, tubes 24 conduct the water to ring manifold 26 from which the water is discharged via return pipe 28 into a water tank 30 for degasification.

The water in the closed circuit stator coil water cooling system is circulated by means of a pump 34 which receives the water in tank 30 and provides it to a heat exchanger 36 where it is cooled to a desired operating temperature and then filtered by filter 38 prior to delivery to manifold 20.

Volume 50 above the water in tank 30 is pressurized with hydrogen gas to maintain an oxygen-free atmosphere and prevent corrosion activity of the stator copper conductors which would be enhanced in the presence of atmospheric oxygen.

During operation, the pressure within tank 30 is maintained between predetermined pressure limits. For this purpose, a relief valve 52 is provided to vent hydrogen in the tank 30 if the pressure rises to a predetermined high level value. If the pressure drops to a predetermined low level value, hydrogen is added so that the proper pressure range is maintained. The addition of hydrogen is accomplished with the provision of a supply 54, the flow of which is governed by valve 56 and pressure regulator 58. Should the water in tank 30 fall below a predetermined level, make-up water is added via valve 60.

The hydrogen gas within the housing of generator 10 is maintained at a higher pressure than the cooling water system. If during normal operation, a coil should develop a crack, hydrogen gas will find its way into the water system, and due to the degasification function of tank 30, the hydrogen will add to volume 50. The same results will obtain, if there is a crack anywhere in the water system within the housing of generator 10, allowing entrance of hydrogen; however, by using additional sensors normally provided for generator diagnostics, the present invention will add one more piece of evidence leading to a conclusion of a cracked coil.

Figure 2:
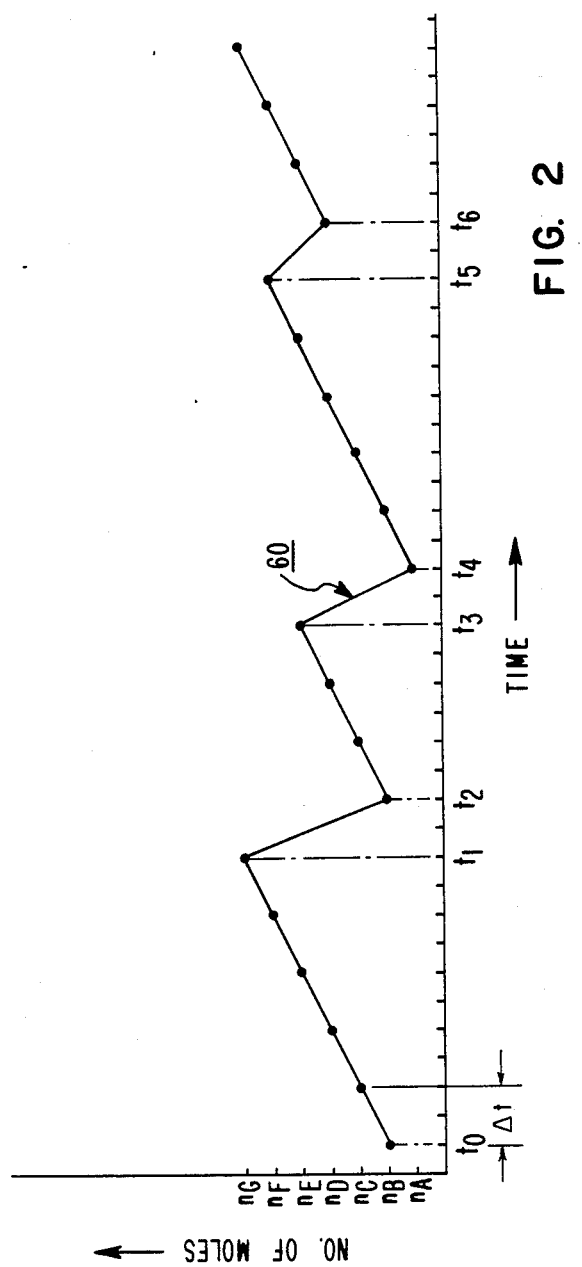
FIG. 2 is a curve illustrating, as a function of time, the amount of gas in the water tank of the system illustrated in FIG. 1.

Curve 60 in FIG. 2 illustrates by way of example the change in the amount of gas in tank 30 due to a cracked coil or other component of the water system within the housing of generator 10. Time is plotted on the horizontal axis and the number of moles of hydrogen gas in tank 30 is plotted on the vertical axis. The number of moles is a convenient parameter for describing the amount of gas in the tank. As is well known to those skilled in the art, a mole is defined as that quantity of a substance whose mass is numerically equal to the molecular weight of the substance.

At time $t_0$, the number of moles in tank 30 as indicated by the solid point, is at a value of $n_B$. Due to the leakage of hydrogen into the water system, at some later time increment $\Delta t$, the number of moles will have increased to a value of $n_C$. This value continually increases up until a value of $n_G$ at time $t_1$, whereupon pressure release valve 52 opens up to reduce the pressure within tank 30 such that at time $t_2$ the number of moles has reduced to a value of $n_B$. It is to be noted that the solid points defining curve 60 are merely by way of example and that under actual circumstances effects of changing temperature, pressure and water value would show up as slow variations in the curve.

Figure 3:
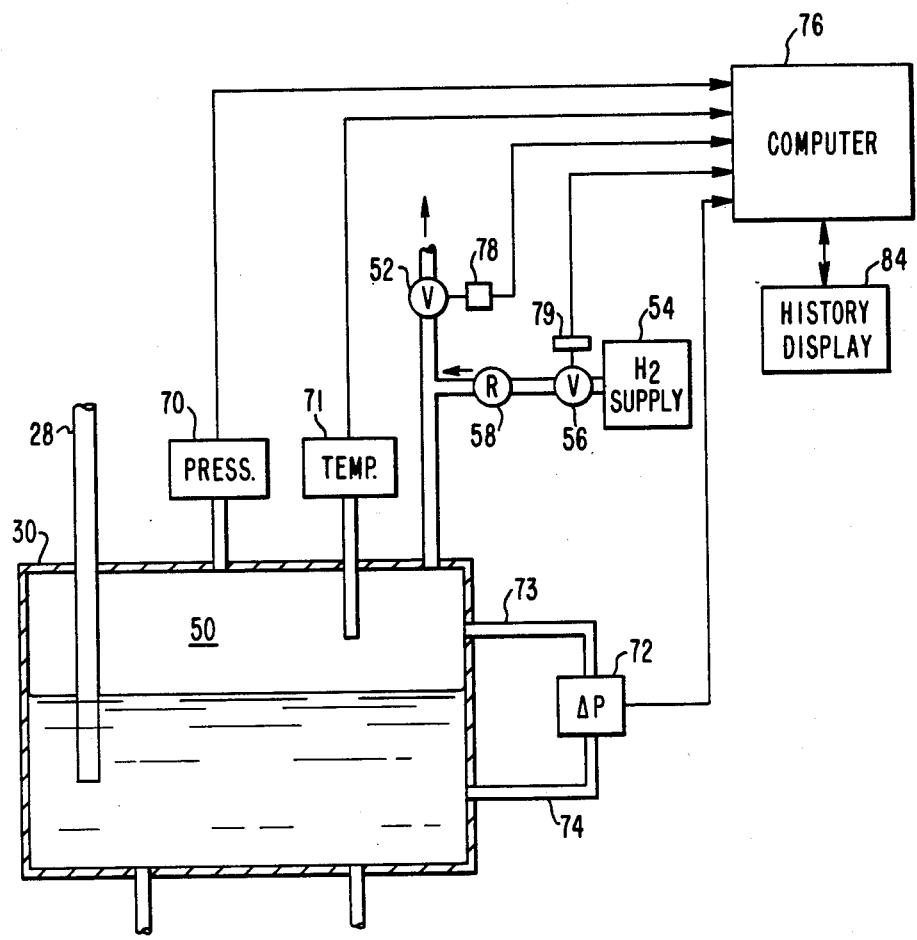
FIG. 3 illustrates one embodiment of the present invention.

From time $t_2$ to $t_3$ the number of moles of gas increases to a value of $n_E$, whereupon a venting operation brings the value down to $n_A$ at time $t_4$. Another venting operation occurs at time $t_5$ where the number of moles may drop down to a value of $n_D$ and increase from that value beginning at time $t_6$. It is seen, therefore, that curve 60 varies from an upper limit of $n_G$ to a lower limit of $n_A$ and provides no long term history from which can be determined the total loss of hydrogen or the loss per unit time. For example, the value of the number of moles at time $t_6$ is $n_D$ and its value has no relation to the total amount of hydrogen which has leaked into the water system. Further, comparing the number of moles at time $t_6$ with the number of moles at time $t_0$ does not given an accurate indication of the rate of loss of hydrogen. The present invention will allow such history to be provided to an operator of the generator apparatus, and to this end reference is made to FIG. 3 illustrating one embodiment of the invention.

The number of moles of hydrogen gas within tank 30 can be determined from the ideal gas equation:

$$PV = nRT \tag{1}$$

where

P is the absolute pressure of the gas,
V the volume of the gas,
R the ideal gas constant, and
T is the absolute temperature of the gas.
The number of moles, n, of gas within the tank is then:

$$n = (PV/RT) \tag{2}$$

Accordingly, a plurality of sensors are provided for obtaining indications of the variable parameters of equation (2). To this end, pressure sensor 70 provides an output signal indicative of the pressure of gas within tank 30, and temperature sensor 31 provides an output signal indicative of the temperature thereof. As the level of water in tank 30 changes, volume 50 changes and, accordingly, since the dimensions of tank 30 are known, an indication of the volume 50 may be derived from a knowledge of water depth.

One way of obtaining an indication of water depth is by the provision of a differential pressure transducer 72 having one arm 73 connected to sense the pressure of the gas, and another arm 74 connected to sense the water pressure, with the resulting difference in pressure being an indication of water depth. It will be apparent that a depth indication may be obtained from a variety of commercially available sensors.

The output signals from the pressure temperature and depth sensors 70-72 are provided to a computer 76 which, from a knowledge of the size and shape of tank 30, derives a value for the volume of gas. With a value R for the ideal gas constant stored in the computer memory, the computer is then operable to compute a value for the number of moles n utilizing equation (2) and will continue to calculate new values of n in predetermined time increments $\Delta t$.

Figure 4:
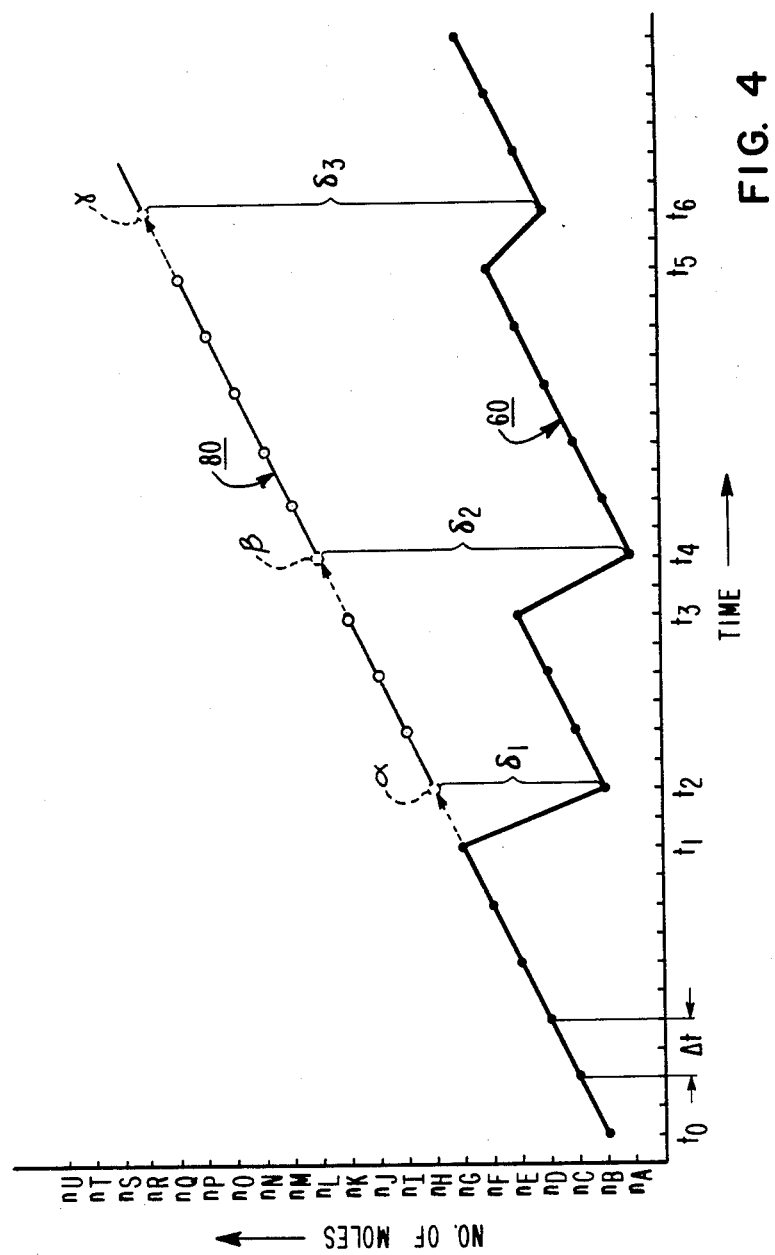
FIG. 4 is a curve, as in FIG. 2, illustrating operation of the present invention.

With additional reference to FIG. 4, there is illustrated for comparison purposes curve 60 of FIG. 2. Computer 76 calculates the number of moles in periodic time increments of $\Delta t$ and stores all or selected points in memory. At time $t_1$, it will be remembered, valve 52 opens up to discharge hydrogen gas, resulting in a lower mole value at time $t_2$. This change in mole value, if it exceeds a certain threshold, is utilized by the computer to calculate a projected value for the number of moles at time $t_2$ had the change not occurred. One way of triggering this calculation is for the computer to determine the difference in moles $n_G - n_B$. As an alternative, and as illustrated in FIG. 3, such change may be determined if either of valves 52 or 56 is opened for at least a certain period of time, indicative of a change in gas volume. Sensors 78 and 79, therefore, are provided to sense an opening of an associated valve 52 or 56 and provide such indication to computer 76.

As a result of the change, the computer brings into effect a curve-fit program for calculation of point $\alpha$, shown dotted and representing the normal next point in series of the curve from $t_0$ to $t_1$. Such curve-fit programs may use linear fits or second order polynomial fits and are well known to those skilled in the art.

Having point $\alpha$, the computer then determines the difference $\delta_i$ between the projected value at point $\alpha$ i.e. $n_H$ and the actual value $n_B$. For each subsequent time increment, up until the next change (if any), this value of $\delta_1$ is added to the actual computed value for n so as to continue the original curve, shown by the hollow points, as though a venting of gas had not occurred. At time $t_3$ a subsequent venting takes place and the computer calculates point $\beta$ as having a value of $n_L$ and calculates the actual number of moles $n_A$, the two points having a difference of $\delta_2$ which is added on to subsequent calculations for n. The scenario of FIG. 4 shows a third venting at time $t_5$ at which time a projected point $\gamma$ is calculated as well as the difference $\delta_3$ between the projected value and actual value.

Thus it is seen that curve 80 will provide an operator with an indication of the total number of moles of gas accumulated by tank 30, since curve 80 presents the number of moles as though no venting had occurred. The information thus acquired by the computer may be presented to an operator with the provision of display 84 which may be of the interactive kind so that such data is selective. In addition to the actual number of moles of gas being accumulated, the slope of curve 80 may be obtained in order to provide the operator with an indication of the leakage loss of hydrogen per unit time.

If operating conditions are such that hydrogen is added to tank 30 by way of valve 56 and regulator 58, the resulting actual number of moles of gas will be greater than the projected value as opposed to less than the projected value as depicted in FIG. 4. If the change happens to be greater, the computer merely subtracts the difference from subsequent actual values to obtain the data points of curve 80.

Figure 5:
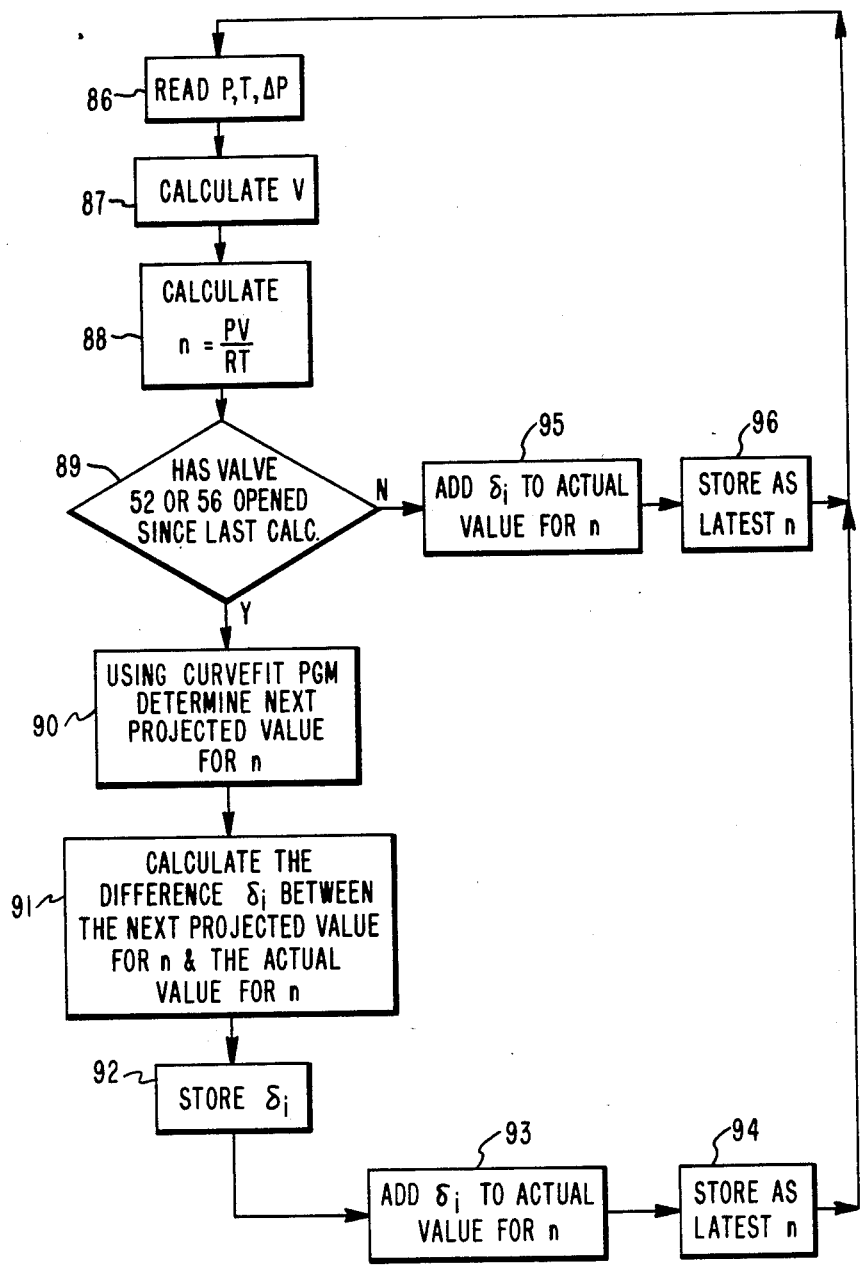
FIG. 5 is a flow chart depicting the step-by-step procedures of the present invention.

FIG. 5 is a flow chart illustrating operation of the computer 76. After each incremental time period $\Delta t$, the outputs from sensors 70-72 are input into the computer as indicated by step 86. From the value of $\Delta p$ (sensor 72), the current volume V is calculated as depicted in step 87. If temperature sensor 71 is of the type which gives a Fahrenheit or Celsius indication, the computer may simply add the appropriate constant to obtain an absolute value.

Having the values for P, V and T as well as the stored value of R, the computer calculates the number of moles n based upon these parameters, as specified by step 88. Decision block 89 determines the next procedural step based upon whether or not a change in volume has occurred as evidenced by an opening of valve 52 or 56 since the last calculation. Let it be assumed that there has been a venting since the last calculation such that the flow continues to step 90 wherein the computer uses a curve-fit program to determine the next projected value for n had the change not occurred. The difference between this next projected value and the actual value for n is computed, as depicted at step 91, and the difference $\delta_i$ is stored, as provided for in step 92. Subsequent steps 93 and 94 add the value of $\delta_i$ to the actual value for n, with the results being stored as the latest value for n. Thus, at time $t_2$ $\delta_i$ as added to $n_B$ to obtain a value of $n_H$ for storage. After the next time increment, a new value for n is calculated, and since neither of the valves 52 or 56 has been opened, the flow will proceed to step 95 which adds $\delta_1$ to the value $n_C$ to derive a value of $n_I$ which is stored as dictated by step 96. The procedure continues in this matter until the subsequent change at time $t_3$, in which case a new $\delta_i$, that is $\delta_2$, is calculated.

The time increments $\Delta t$ may be selected by an operator and may by way of example be in the order of one or several minutes. If desired, and depending upon the size of the computer memory, all data points for a day may be recorded and displayed. If desired, selected data points for the day, or even an average for the day, may be determined and stored, so as to expand the history time base. For example, if the daily average slowly increases over a period of days or weeks, relatively small cracks or leaks in the system may be observed.

The calculation of the number of moles n is a function of several parameters P, V and T and the accuracy in the mole determination will be a function of the accuracy of the sensors utilized. If less accuracy is acceptable, the temperature sensor may even be omitted and a constant utilized in place of its output reading. For example, a $\pm 10°$ C. change in temperature results in only a $\pm 4\%$ change in the calculated moles of gas.

I claim:

1. Apparatus for monitoring cooling gas leakage into a closed circuit liquid cooling system of an electric generator, the interior of which is cooled by said cooling gas and the stator coils of which are internally cooled by said closed circuit liquid cooling system, said closed circuit liquid cooling system including a liquid tank pressurized by a source of gas of the same type of said cooling gas, said cooling gas leakage being indicative of a breach in said closed circuit liquid cooling system, and causing a net increase of the amount of gas in said liquid tank, comprising:
   (A) sensor means operable to sense predetermined parameters relative to said liquid tank and provide corresponding output signals indicative thereof;
   (B) computer means responsive to said output signals and operable in repetitive time increments to calculate, for each said time increment, the number of moles of gas within said liquid tank;
   (C) means for determining a relatively rapid change in the number of said moles due to an addition to, or venting of gas from, said liquid tank;
   (D) said computer means being operable to estimate a projected value for the number of moles of said gas within said liquid tank after said change, had said change not occurred;
   (E) said computer means being further operable to obtain the difference between said projected value and the actual calculated number of moles and to add said difference to the actual calculated number of moles for that time increment and to subsequent calculated number of moles for subsequent time increments.

2. Apparatus according to claim 1, wherein:
   (A) said sensor means includes a pressure sensor operable to provide an indication of the pressure of said gas within said liquid tank.

3. Apparatus according to claim 1, wherein:
   (A) said sensor means includes a temperature sensor operable to provide an indication of the temperature of said gas within said liquid tank.

4. Apparatus according to claim 1, wherein:
   (A) said sensor means includes means for obtaining an indication of the volume of the gas within said liquid tank.

5. Apparatus according to claim 4, wherein:
   (A) said means for obtaining is a liquid level sensor.

6. Apparatus according to claim 5, wherein:
   (A) said liquid level sensor is a differential pressure sensor connected to provide an indication of the difference in pressure between the gas within said liquid tank and a certain depth of liquid within said liquid tank.

7. Apparatus according to claim 1, which includes:
   (A) a vent line;
   (B) a first valve connected in said vent line and operable to open if the pressure of said gas within said liquid tank rises above a certain pressure level;

(C) a supply line connected between said source of gas and said liquid tank;

(D) means connected in said supply line for supplying said gas from said source to said liquid tank if the pressure of said gas within said tank falls below a certain pressure level;

(E) means for sensing when said first valve opens to vent said gas within said liquid tank.

8. Apparatus according to claim 7, which includes:

(A) means for sensing when said gas within said liquid tank is provided to said liquid tank from said source of gas.

* * * * *